Figure 1:
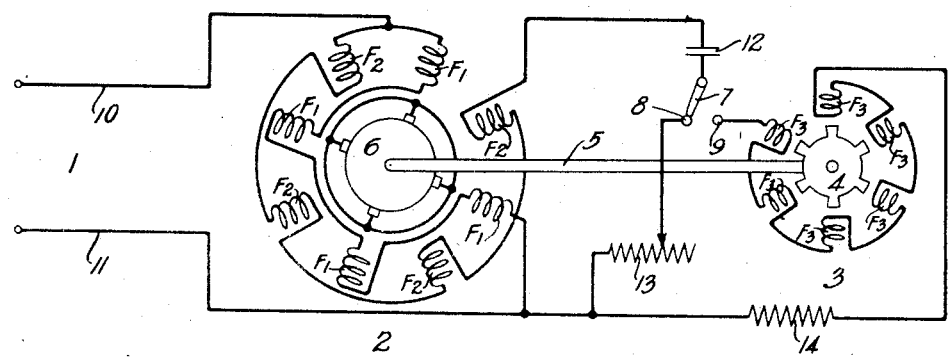

Aug. 30, 1932.   H. M. STOLLER ET AL   1,874,380
REGULATED MOTOR SYSTEM
Filed Jan. 5, 1929

INVENTORS  H. M. STOLLER
E. R. MORTON
BY Wayne B Wells
ATTORNEY

Patented Aug. 30, 1932

1,874,380

UNITED STATES PATENT OFFICE

HUGH M. STOLLER, OF MOUNTAIN LAKES, NEW JERSEY, AND EDMUND R. MORTON, OF BROOKLYN, NEW YORK, ASSIGNORS TO BELL TELEPHONE LABORATORIES, INCORPORATED, OF NEW YORK, N. Y., A CORPORATION OF NEW YORK

REGULATED MOTOR SYSTEM

Application filed January 5, 1929. Serial No. 330,464.

This invention relates to automatic regulating systems for dynamo-electric machines and particularly to speed regulating systems for governing the operation of alternating current motors.

One object of the invention is to provide a regulating system that will automatically maintain the speed of an A. C. commutator motor substantially constant.

Another object of the invention is to provide a relatively simple and inexpensive means for maintaining the speed of an alternating current motor substantially constant at a certain speed and also to provide means for varying the speed of the motor at will.

A further object of the invention is to provide a motor having a single phase commutator rotor and a field winding arranged to produce a field or exciting flux in phase with the secondary current, a variable impedance in the field circuit to vary the speed of the motor, and an auxiliary dynamo-electric machine whose rotor is mechanically coupled to the rotor of the main motor and whose primary winding reacts on the field of the main motor to maintain the speed of the main motor constant.

In many instances it is essential to operate certain machines and devices at substantially constant speed and also to provide for variable speed operation. When only an alternating current supply is available considerable difficulty has been encountered due to the fact that the speed of an induction motor varies in accordance with the load and the voltage and frequency of the supply circuit.

In the prior art various means for obtaining constant speed operation of motors have been employed, such as electromagnetically operated devices for varying the resistance in the armature circuit and regulators employing thermionic discharge devices, all of which have either been expensive as to original cost or maintenance.

In a motor speed regulating system that is constructed in accordance with the invention, the rotor of a small auxiliary dynamo-electric machine is secured to the shaft of the main motor whose speed is to be regulated. The primary winding of the auxiliary dynamo-electric machine is connected in series with the field winding of the main machine. The type of main motor which is preferred is a single phase commutator type in which the field voltage is dephased from the secondary current so as to provide a field or exciting flux substantially in phase with the secondary current. The rotor is of the type used on D. C. motors. This type of motor permits of variable speed operation with shunt motor characteristics by changing the field flux as, for example, by means of a rheostat in the field circuit.

Figure 2:
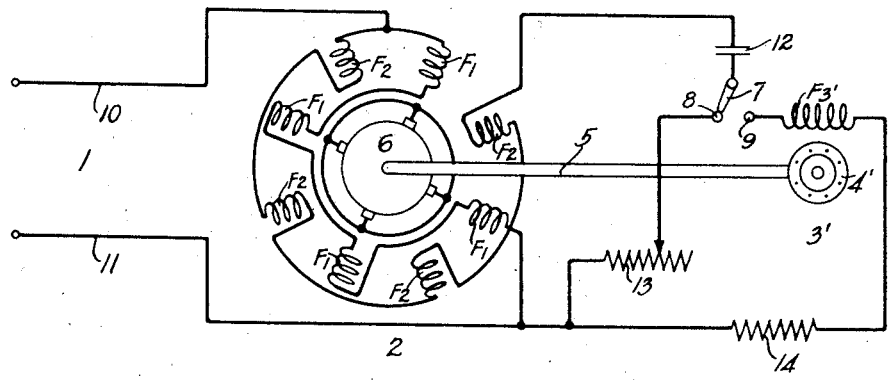

In the particular system shown on the accompanying drawing the speed of the main motor is maintained substantially constant at a speed in the neighborhood of 1200 R. P. M. The main motor employed is preferably a four-pole machine. With the primary winding of the auxiliary regulating machine disconnected from the field winding of the main motor, the main motor will operate as a four-pole shunt A. C. motor, the speed of which may be varied by varying the impedance in the field circuit. The operation of this machine is similar to that described on pages 2487 and 2488, vol. 30 of A. I. E. E. Transactions, published December 8, 1911. The machine is shown in Fig. 2 on page 2488. In general this machine operates similar to a D. C. shunt motor in that when the field is weakened by increasing the impedance in the field circuit, the speed of the motor is increased and when the field is strengthened by decreasing the impedance in the field circuit, the speed of the motor is decreased.

In one embodiment of the invention herein shown and described the auxiliary dynamo-electric machine is of the synchronous salient pole type having six poles, so that at synchronous speed when the primary winding on the auxiliary regulating machine is connected to the field of the main motor, the auxiliary regulating machine will act as a motor or a generator depending on its phase condition relative to the field current. At speeds other than synchronous speed it will be principally an impedance in series with the field of the main motor. When running in synchronism if, due to a change in load or in the supply voltage, the speed tends to decrease, the phase relations mentioned will change and the auxiliary regulating machine will act as a motor and develop a counter E. M. F. which will oppose the line voltage and reduce the current through the field of the main motor. This weakens the field of the main motor to maintain the motor speed constant. Likewise, if the speed of the main motor tends to increase slightly above the normal speed, the auxiliary regulating machine will act as a generator and develop an aiding E. M. F. which will add to the line voltage and increase the current through the field of the main motor. This strengthens the field of the main motor to maintain the motor speed constant.

In the preferred embodiment of the invention the auxiliary machine is of the asynchronous motor type having a squirrel cage rotor and is so designed that when the primary winding of the auxiliary regulating machine is connected to the field of the main motor the auxiliary machine will not act as a motor or a generator at precisely synchronous speed (1200 R. P. M. in the case of 60 cycles) but merely as an impedance in series with the field of the main motor. If, due to a change in load or in supply voltage, the speed of the motor is decreased slightly below the normal operating speed, the auxiliary regulating machine will act as a motor and develop a counter E. M. F. which will oppose the line voltage and reduce the current through the field of the main motor thereby weakening the field of the main motor. This weakening of the motor field causes the motor to maintain constant speed. Likewise, if the speed of the main motor increases slightly above the normal speed, the auxiliary regulating machine will act as a generator and develop an aiding E. M. F. which will add to the line voltage and increase the current through the field of the main motor thereby strengthening the field of the main motor. This strengthening of the motor field causes the motor to maintain constant speed. In a device of this character it has been found possible to hold the speed of the main motor to within one-quarter of 1% for normal fluctuation in line voltage and load changes.

The invention may be more readily understood by reference to the following detailed description in connection with the accompanying drawing, in which Fig. 1 shows one embodiment of the invention in which the auxiliary regulating machine is of the synchronous salient pole type and Fig. 2 shows the preferred embodiment of the invention in which the auxiliary regulating machine is of the asynchronous squirrel cage type.

Referring to Fig. 1 of the drawing a source of electric energy 1 which in this particular case is alternating current is connected to a main A. C. commutator motor 2. The frequency of the alternating current is assumed to be held substantially constant at 60 cycles per second. An auxiliary dynamo-electric machine 3 has its rotor 4 coupled to the same shaft 5 as the rotor 6 of the main motor 2. A switch 7 is provided so that when it is thrown to position 8 as shown, the auxiliary dynamo-electric machine 3 will not be energized. With the switch 7 thrown to position 9 the auxiliary dynamo-electric machine 3 is energized.

The main motor 2 is a four-pole shunt A. C. motor of the commutator type having stator or primary windings $F_1$ which are connected to conductors 10 and 11 from the source 1. A voltage is induced across the secondary windings of the rotor 6 from the stator or primary windings $F_1$. Field or exciting coils $F_2$ are also provided on the stator of the main motor 2.

When the switch 7 is thrown to position 8 as shown, the circuit through the field or exciting coils $F_2$ is traced from conductor 10 through coils $F_2$, capacity 12, switch 7, and variable resistance 13 to conductor 11. The value of capacity 12 is such that the voltage across coils $F_2$ is dephased with respect to the line voltage so that the field or exciting flux is substantially in phase with the secondary current. The value of resistance 13 may be varied to vary the current value through coils $F_2$.

The auxiliary dynamo-electric machine 3 is a six-pole synchronous salient pole type machine having stator windings $F_3$ associated with the rotor 4. When the switch 7 is thrown to position 9 the circuit through the field or exciting coils $F_2$ of the main motor 2 is traced from conductor 10, through coils $F_2$, capacity 12, switch 7, primary winding $F_3$ of the auxiliary dynamo-electric machine 3, and resistance 14 to conductor 11. The value of resistance 14 is such that the proper current value is obtained when the machine is running at normal speed. The value of this resistance may be zero in certain cases. Primary windings $F_1$ and field windings $F_2$ of the main motor 2 and primary windings $F_3$ of the auxiliary dynamo-electric machine are preferably mounted on the same relatively stationary member.

Considering the operation of the main motor 2 when the switch 7 is thrown to position 8, current flows from the supply conductor 10, through the primary windings $F_1$ to the supply conductor 11, thereby impressing on windings $F_1$ a voltage, the frequency of which is maintained substantially constant at 60 cycles per second. When the rotor 6 of the main motor 2 is revolving a voltage is induced by transformer action in the secondary coils which are wound on the rotor 6. The secondary winding on the rotor 6 is identical with that usually employed on D. C. motors. The flux produced by the field windings $F_2$ lags 90° behind the E. M. F. across $F_2$ while the secondary current is substantially in phase with the flux. To bring the field flux in phase with the secondary current it is necessary to excite the field by means of an E. M. F. leading 90° from that applied to the primary winding. This is accomplished by means of a condenser in series with field coils $F_2$. Current passes from the supply conductor 10 through field coils $F_2$, capacitance 12, switch 7, and variable resistance 13 to the supply conductor 11. The value of capacitance 12 is selected so that the current flowing through coils $F_2$ is in phase with the current through the secondary winding on rotor 6 of the main motor 2. Thus an E. M. F. is provided across field coils $F_2$ which leads the E. M. F. applied to the primary winding by 90°. This produces a field or exciting flux substantially in phase with the secondary current. The main motor 2 will then have operating characteristics similar to a D. C. shunt motor in that when the field is weakened by increasing the impedance in the field circuit, the speed of the motor is increased and when the field is strengthened by decreasing the impedance in the field circuit, the speed of the motor is decreased. The variable resistance 13 regulates the values of the impedance of the field circuit.

Precise constant speed operation of the motor is obtained by throwing the switch 7 to position 9. The switch 7 in position 9 connects the primary windings $F_3$ of the synchronous salient pole type dynamo-electric machine 3 in series with the field or exciting coils $F_2$ of the main motor 2. The auxiliary synchronous machine 3 is shown as a six-pole machine while the main motor 2 is shown as a four-pole A. C. commutator machine. With a frequency of 60 cycles per second the six-pole auxiliary dynamo-electric machine attains its synchronous speed at 1200 R. P. M. at this speed it operates as a generator or a motor depending on its phase position relative to the field current. At speeds other than synchronous speed it will be principally an impedance in series with the field or exciting coils $F_2$ of the main motor 2. The resistance 14 is provided in series with field coils $F_2$ of the main motor 2 and the primary windings $F_3$ of the auxiliary dynamo-electric machine 3 so that the current through these coils can be adjusted to its correct value when the motor 2 is operating at normal speed. Obviously, if the impedance of the field coils $F_2$ and primary winding $F_3$ is of such a value that the proper current is obtained, the resistance 14 may be omitted.

If when running at synchronous speed the speed of the main motor 2 tends to decrease below the normal speed due to a change in load or applied voltage, the rotor 4 of the auxiliary dynamo-electric machine 3 also tends to decrease in speed. The phase relation mentioned above will change and the auxiliary dynamo-electric machine will act as a motor and develop a counter E. M. F. which will oppose the line voltage and reduce the current through the field $F_2$ of the main motor 2. The field of the main motor 2 is thereby weakened which causes the motor to maintain its normal speed. Likewise, if the speed of the main motor tends to increase slightly above normal speed, the auxiliary dynamo-electric machine 3 will act as a generator and develop an aiding E. M. F. which will add to the line voltage and increase the current through the field $F_2$ of the main motor 2. The field of the main motor is thereby strengthened which causes the motor to maintain its normal speed.

Referring to Fig. 2 it will be seen that the system is similar to that shown in Fig. 1 except that an asynchronous squirrel cage type dynamo-electric machine 3' having a rotor 4' and a primary winding $F_3'$ is employed in place of the synchronous type machine 3. The primary winding $F_3'$ is connected to the rest of the circuit in the same manner that the primary windings $F_3$ are connected in Fig. 1.

When the switch 7 is thrown to position 8 the operation of the system shown in Fig. 2 is identical with the system shown in Fig. 1. The switch 7 is thrown to position 9 to obtain precise constant speed operation. The switch 7 in position 9 connects the primary winding $F_3'$ of the asynchronous dynamo-electric machine 3 in series with the field or exciting coils $F_2$ of the main motor 2. The auxiliary dynamo-electric machine 3' is a six-pole squirrel cage machine and main motor 2 is a four-pole A. C. commutator machine. With a frequency of 60 cycles the six-pole auxiliary dynamo-electric machine 3' attains its synchronous speed at 1200 R. P. M. When it is driven at this speed by the main motor 2 it operates neither as a generator nor as a motor. At this speed the auxiliary motor generator 3' acts as impedance in series with the field or exciting coils $F_2$ of the main motor 2. This speed is the normal speed of the motor corresponding to mean line voltage and mean load. The resistance 14 is provided in series with field coils $F_2$ and primary winding $F_3'$ so that the current through these coils can be adjusted to its correct value when the motor 2 is operated at normal speed. Obviously, if the impedance of the primary winding $F_3'$ and the field coils $F_2$ are of such a value that the proper current is obtained, the resistance 14 may be omitted.

If, due to a slight change in load or applied voltage, the speed of the main motor 2 decreases below its normal speed, the rotor 4' of the auxiliary dynamo-electric machine 3' also tends to decrease in speed. When the rotor 4' is revolving at a speed less than its synchronous speed the auxiliary motor generator 3' acts as a motor and develops a counter E. M. F. which will oppose the line voltage and reduce the current through the field coils $F_2$ of the main motor 2. The field of the main motor 2 is thereby weakened. This causes the motor to maintain a speed only slightly below normal speed. Likewise if the speed of the main motor 2 increases slightly above its normal speed, the auxiliary dynamo-electric machine 3' will act as a generator and develop an aiding E. M. F. which will add to the line voltage and increase the current through the field winding $F_2$ of the main motor 2. The field of the main motor 2 is thereby strengthened. This causes the motor to maintain a speed only slightly above normal speed.

In one design of the invention according to Fig. 2 the speed was found to hold within one quarter of one per cent of synchronous speed for normal variations in load and line voltage.

While two embodiments of the invention have been shown and described in detail, it is understood that the invention is generic in character and is not to be construed as limited to the particular embodiments, since numerous modifications thereof may be made by persons skilled in the art without departing from the spirit of applicants' invention, the scope of which is to be determined by the appended claims.

What is claimed is:

1. In combination, an alternating current motor of the commutator type having a primary winding and an exciting winding, means for impressing a voltage on the primary winding of said motor, means for impressing on the exciting winding of said motor a voltage dephased from the voltage impressed on said primary winding and means for suitably impressing in the excitation circuit another electromotive force whose magnitude depends upon the speed of said motor.

2. In combination, an alternating current motor of the commutator type having an exciting winding and a primary winding, means for impressing on said exciting winding a voltage dephased from the voltage impressed on the primary winding and means for suitably impressing in the excitation circuit another electromotive force whose magnitude depends upon the speed of said motor, said last mentioned means comprising the primary winding of a dynamo-electric machine.

3. In combination, an alternating current motor of the commutator type having an exciting winding and a primary winding, means for impressing on said exciting winding a voltage dephased from the voltage impressed on the primary winding, and means for suitably impressing in the excitation circuit another electromotive force whose magnitude depends upon the speed of said motor, said last mentioned means comprising the primary winding of an asynchronous dynamo-electric machine.

4. In combination, an alternating current motor of the commutator type having an exciting winding and a primary winding, said primary winding being connected to a single phase supply circuit, means for impressing on said exciting winding from said supply circuit a voltage dephased from the voltage impressed on said primary winding, and means for suitably impressing in the excitation circuit from the supply circuit another electromotive force whose magnitude depends upon the speed of said motor, said last mentioned means comprising an asynchronous dynamo-electric machine which revolves at a speed proportional to the speed of said motor.

5. In combination, an alternating current motor of the commutator type having an exciting winding and a primary winding, said primary winding being energized from a single phase supply circuit, means for impressing on said exciting winding from said supply circuit a voltage dephased from the voltage impressed on said primary winding and means for suitably impressing in the excitation circuit from the supply circuit another electromotive force whose magnitude depends upon the speed of said motor, said last mentioned means comprising a dynamo-electric machine which revolves at a speed proportional to the speed of said motor.

6. In a single phase alternating current motor, the combination of two rotors mounted on a common shaft, one of said rotors being provided with a direct current motor winding and the other of said rotors having a squirrel cage winding, a primary winding associated with the direct current rotor winding, and means comprising a primary stator winding for said squirrel cage rotor connected to a field stator winding for producing field flux for the D. C. rotor for preventing change in the current conditions in each of said stator windings by the current conditions in the other at normal operating speed, for opposing and reducing the current in said field winding by the current in the primary winding associated with the squirrel cage winding when the speed is reduced below normal to increase the speed to normal, and for aiding and thereby increasing the current in said field winding by the current in the primary winding associated with the squirrel cage winding when the speed is increased above normal to reduce the speed to normal.

7. In an alternating current motor arrangement for both variable and constant speed, a main shunt alternating current motor having primary and field windings, means for varying the impedance of said field winding circuit at will to produce variable speed and an auxiliary dynamo-electric machine coupled to said motor and arranged to have its primary winding connected to the field winding of said main motor, said machine serving to control the field current of said main motor in accordance with the speed of said motors to maintain them at constant speed.

8. In an alternating current motor arrangement for both variable and constant speed operation, a main shunt alternating current motor having primary and field windings, means for varying the impedance of said field winding circuit at will to produce variable speed and an auxiliary dynamo-electric machine coupled to said motor and having a squirrel cage rotor and a primary winding connected to the field winding circuit of said main motor, said machine serving to control the field current of said main motor in accordance with the speed of said motors to maintain them at constant speed.

9. In an alternating motor arrangement for constant speed operation, a main motor whose speed is to be maintained constant, said main motor having a primary and a field winding, and an auxiliary dynamo-electric machine having its rotor coupled to the same shaft as the rotor of said main motor and having its primary winding connected in series with the field winding of said main motor to control the field current of said main motor in accordance with the speed of said motors to maintain them at constant speed.

10. In an alternating current motor arrangement, a relatively stationary member and a relatively rotatable member, each of said members being correspondingly provided with two distinct magnetic cores, one of said magnetic cores on the relatively stationary member being provided with primary and field windings and the other core being provided with a primary winding connected to the field winding of the first mentioned core, a source of alternating current connected to the primary and field windings of the first mentioned core, a direct current commutator winding on one of said magnetic cores of said relatively rotating member, and a relatively low resistance secondary member of the induction motor type mounted on the other magnetic core of said relatively rotating member.

11. In an alternating current motor arrangement for either variable or constant speed operation, a main motor whose speed is to be controlled, said main motor having a primary and a field winding, an auxiliary dynamo-electric machine having its rotor coupled to the same shaft as the rotor of said main motor and arranged to have its primary winding connected in series with the field winding of said main motor to control the field current of the main motor in accordance with the speed of said motors to maintain them at constant speed, and means for disconnecting said primary winding of said auxiliary dynamo-electric machine from the field winding of said main motor and for connecting adjustable means in series with said field winding of said main motor to vary its speed by controlling the field flux of said main motor.

12. In an alternating current motor arrangement, a relatively stationary member, and a relatively rotatable member, each of said members being correspondingly provided with two distinct magnetic cores, one of said magnetic cores on the relatively stationary member being provided with two distinct windings, the other of said magnetic cores on the relatively stationary member being provided with a winding connected in series with one of said windings on said first mentioned magnetic core, means for energizing said relatively stationary member, a D. C. commutated winding on one of the magnetic cores of said relatively rotating member, and a relatively low resistance secondary member of the induction motor type mounted on the other magnetic core of said relatively rotating member.

13. In combination, an alternating current motor having the speed characteristics of a shunt wound direct current motor, a field winding for said motor, said field winding increasing the motor speed upon decreased current flow through the field winding and decreasing the motor speed upon increased current flow through the field winding, and means for automatically controlling the field winding current directly according to the motor speed to hold the motor speed substantially constant.

14. In combination, an alternating current motor having the characteristics of a shunt wound direct current motor, a field winding for said motor, said field winding increasing the motor speed upon decreased current flow through the field winding and decreasing the motor speed upon increased current flow through the field winding, means to vary the field winding current to control the motor speed at will, and means for automatically controlling the field winding current directly according to the motor speed to hold the motor speed substantially constant.

15. The combination with an alternating current motor having a primary winding, a secondary winding, and a field winding, of means for varying the current of said field winding circuit to control the motor speed at will and means for automatically controlling the field winding current according to the motor speed to maintain the motor speed substantially constant.

16. In combination, an alternating current motor adapted for operation from a source of alternating current and having field and armature windings, and means for holding a substantially fixed relation between the speed of the motor and the frequency of the power supply at different frequencies of the power supply and comprising means for controlling the field current of the motor.

17. In combination, an alternating current motor of the commutator type adapted for operation from a source of alternating current and having field and primary windings, an auxiliary dynamo-electric machine, and means for holding a substantially fixed relation between the speed of the motor and the frequency of the source of alternating current at different frequencies of the source of alternating current and comprising said machine for reacting on said field winding of the alternating current motor.

18. In combination, an alternating current motor of the commutator type operated from a source of alternating current and having field and primary windings and means for holding the speed of said motor substantially constant at a speed other than synchronous speed relative to the frequency of the source of alternating current and for holding a substantially fixed relation between the speed of the motor and the frequency of the source of alternating current at different frequencies of the alternating current and comprising means for controlling the field current of said motor.

19. In combination, an alternating current motor of the commutator type operated from a source of alternating current and having field and primary windings, an auxiliary asynchronous dynamo-electric machine, and means for holding a substantially fixed relation between the speed of said motor and the frequency of the source of alternating current when the frequency of the source is varied and is held constant and comprising said machine for reacting on said field winding.

20. In combination, a main alternating current motor of the commutator type operated from a source of alternating current and having field and primary windings, an auxiliary asynchronous dynamo-electric machine, and means for holding the speed of said motor substantially constant at a speed other than synchronous speed relative to the frequency of the source of alternating current and for holding a substantially constant fixed relation between the speed of the motor and the frequency of the source of alternating current at different frequencies of the source of alternating current and comprising said machine reacting on the field of said motor.

In witness whereof, we hereunto subscribe our names this 2nd day of January, 1929.

HUGH M. STOLLER.
EDMUND R. MORTON.